(12) United States Patent
Grasso et al.

(10) Patent No.: US 9,290,156 B2
(45) Date of Patent: Mar. 22, 2016

(54) CONNECTION BASE INTERACTING WITH AN ADAPTER FOR FORMING THEREWITH MECHANICAL CONNECTOR FOR THE WIPER BLADE FOR AN AUTOMOBILE

(75) Inventors: Guiseppe Grasso, Le Breuil sur Couze (FR); Xavier Bousset, Mezel (FR)

(73) Assignee: VALEO SYSTEMES D'ESSUYAGE, La Verriere (FR)

( * ) Notice: Subject to any disclaimer, the term of this patent is extended or adjusted under 35 U.S.C. 154(b) by 666 days.

(21) Appl. No.: 12/602,024

(22) PCT Filed: May 5, 2008

(86) PCT No.: PCT/EP2008/055482
§ 371 (c)(1),
(2), (4) Date: Mar. 23, 2010

(87) PCT Pub. No.: WO2008/145481
PCT Pub. Date: Dec. 4, 2008

(65) Prior Publication Data
US 2010/0186185 A1    Jul. 29, 2010

(30) Foreign Application Priority Data

May 31, 2007 (FR) ...................................... 07 03853

(51) Int. Cl.
*B60S 1/40*    (2006.01)
*B60S 1/38*    (2006.01)

(52) U.S. Cl.
CPC .. *B60S 1/40* (2013.01); *B60S 1/387* (2013.01); *B60S 1/4003* (2013.01); *B60S 1/381* (2013.01);
(Continued)

(58) Field of Classification Search
CPC .. B60S 2001/4012; B60S 1/40; B60S 1/4077; B60S 1/4045; B60S 1/3849; B60S 1/3851; B60S 1/3853

USPC .......... 15/250.32, 250.43, 250.201, 250.361, 15/250.44–250.48
See application file for complete search history.

(56) References Cited

U.S. PATENT DOCUMENTS 2,861,290 A * 11/1958 Hoyler ........................ 15/250.32
2,965,915 A * 12/1960 Krohm ........................ 15/250.32
(Continued)

FOREIGN PATENT DOCUMENTS

DE    10029144 A1 * 12/2001 ................ B60S 1/38
EP    1 681 216 A1    7/2006
(Continued)

OTHER PUBLICATIONS

WO2006117308 A2 (machine translation), Nov. 9, 2006.*
(Continued)

*Primary Examiner* — Monica Carter
*Assistant Examiner* — Andrew A Horton
(74) *Attorney, Agent, or Firm* — Osha Liang LLP

(57) ABSTRACT

The present disclosure relates to a connection base for carrying a wiping blade and to be attached to an adapter that can be connected to an actuation arm for forming with said adapter a mechanical connector for a wiper blade for an automobile, the adapter having an elongated shape with first and second ends, characterised in that it includes a retaining linear guide for the first end of the adapter and removable attachment means of the second end supported on the one hand by the adapter and on the other hand by the base. The present disclosure also relates to a conform adapter, to a mechanical connector formed by the adapter and the connection base, to a planar wiper blade and to a wiping device.

17 Claims, 7 Drawing Sheets

Figure 1:
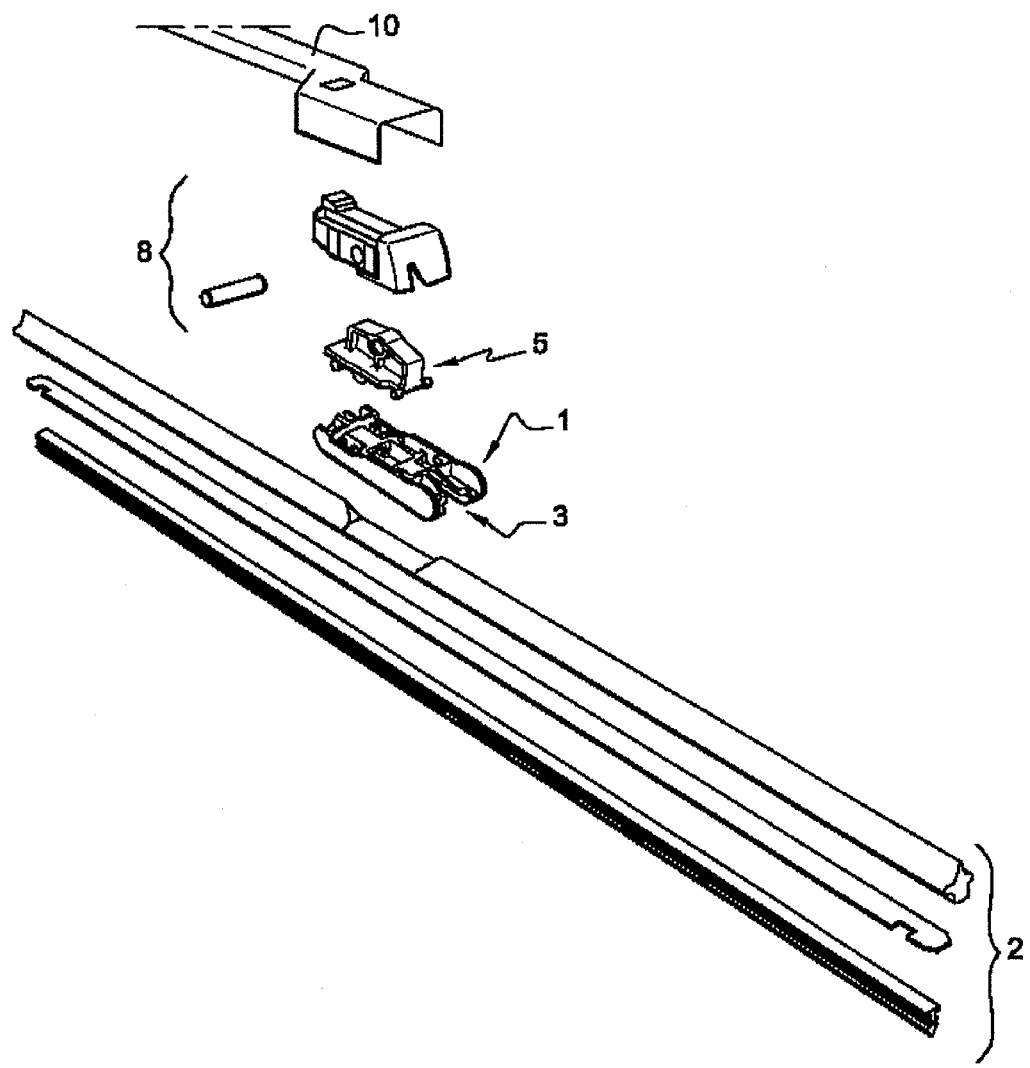

(52) U.S. Cl.
CPC .............. *B60S 1/3875* (2013.01); *B60S 1/4009* (2013.01); *B60S 1/4048* (2013.01); *B60S 1/4067* (2013.01); *B60S 2001/3844* (2013.01)

(56) References Cited

U.S. PATENT DOCUMENTS

| | | | | |
|---|---|---|---|---|
| 2,974,341 | A * | 3/1961 | Hart | 15/250.32 |
| 3,179,969 | A * | 4/1965 | Glynn | 15/250.32 |
| 3,180,757 | A * | 4/1965 | Wise | 134/6 |
| 3,408,678 | A * | 11/1968 | Linker | 15/250.05 |
| 3,416,180 | A * | 12/1968 | Deutscher et al. | 15/250.32 |
| 3,838,475 | A * | 10/1974 | Quinlan et al. | 15/250.32 |
| 3,871,050 | A * | 3/1975 | Baut et al. | 15/250.32 |
| 3,942,212 | A * | 3/1976 | Steger et al. | 15/250.201 |
| 4,094,039 | A * | 6/1978 | Waterman et al. | 15/250.32 |
| 4,224,001 | A * | 9/1980 | Arndt et al. | 403/163 |
| 4,324,019 | A * | 4/1982 | Mohnach et al. | 15/250.32 |
| 4,343,064 | A * | 8/1982 | van den Berg et al. | 15/250.32 |
| 5,084,933 | A * | 2/1992 | Buechele | 15/250.32 |
| 5,383,248 | A * | 1/1995 | Ho | 15/250.32 |
| 5,560,072 | A * | 10/1996 | Teindas | 15/250.32 |
| 6,336,243 | B1 * | 1/2002 | Charng | 15/250.201 |
| 6,609,267 | B1 * | 8/2003 | Journee et al. | 15/250.32 |
| 6,742,217 | B1 * | 6/2004 | Elkins | 15/250.43 |
| 8,544,137 | B2 * | 10/2013 | Thienard | 15/250.32 |
| 8,549,696 | B2 * | 10/2013 | Boland et al. | 15/250.32 |
| 2006/0021178 | A1 * | 2/2006 | Verelst et al. | 15/250.32 |
| 2006/0059647 | A1 * | 3/2006 | Ostrowski | 15/250.32 |
| 2006/0207050 | A1 * | 9/2006 | Shanmugham et al. | 15/250.43 |
| 2006/0248675 | A1 * | 11/2006 | Vacher et al. | 15/250.32 |
| 2007/0067939 | A1 * | 3/2007 | Huang | 15/250.32 |
| 2007/0089257 | A1 * | 4/2007 | Harita et al. | 15/250.04 |
| 2007/0094833 | A1 * | 5/2007 | Poton | 15/250.32 |
| 2008/0078051 | A1 * | 4/2008 | Herring et al. | 15/250.001 |
| 2008/0163446 | A1 * | 7/2008 | Thienard | 15/250.32 |

FOREIGN PATENT DOCUMENTS

| | | | |
|---|---|---|---|
| FR | 2 753 943 A1 | 4/1998 | |
| FR | 2781742 A1 * | 2/2000 | B60S 1/40 |
| WO | WO 0196156 A1 * | 12/2001 | B60S 1/38 |
| WO | WO 2005102800 A1 * | 11/2005 | B60S 1/40 |
| WO | 2006/069648 A1 | 7/2006 | |
| WO | WO 2006069648 A1 * | 7/2006 | B60S 1/40 |
| WO | 2006/117308 A2 | 11/2006 | |
| WO | WO 2006117308 A2 * | 11/2006 | |

OTHER PUBLICATIONS

International Search Report for PCT/EP2008/055482 mailed Jul. 30, 2008 (4 pages).

* cited by examiner

CONNECTION BASE INTERACTING WITH AN ADAPTER FOR FORMING THEREWITH MECHANICAL CONNECTOR FOR THE WIPER BLADE FOR AN AUTOMOBILE

The present invention relates to a connection base interacting with an adapter for forming therewith a mechanical connector for a wiper blade for an automobile, a conforming adapter, a connector formed by the base and the adapter as well as a wiper blade and a wiping device.

The invention finds a particularly advantageous, but non exclusive, application in the field of wiper blade systems for automobiles. As compared to straight wiper blades which are currently mostly used, a flat wiper blade has the particularity of having no swing bar structure. This new generation of wiper blade is always provided with a flexible scraper, but the external armature intended to carry it is replaced, here, by a flexible structure which is directly incorporated in the blade.

In addition, just like its straight homologous device of the state of the art, a flat wiper blade includes connection means, so that it can be coupled to any actuation arm having the appropriate shape. It should be reminded thereabout that various types of wiper arms exist, such as for example hook arms, side pivoting axis arms, longitudinally clamping arms, etc.

Be that as it may, flat wiper blades have the disadvantage of not being standardised, more particularly as regards the connection means used for connecting the same. In practice, there are as many types of flat wiper blades as different wiper arms. In addition, for a given category of flat wiper blades, there is a plurality of different embodiments because of the multiplicity of manufacturers existing on the market. This is the reason why in the end, there are such many flat wiper blades integrating connection means specific to a given type of actuation arm.

Such an excessive offer is of course stimulating as regards innovation for the manufacturers wishing to be distinguished from their competitors. But as a counterpart, the multiplication of references at the production and/or the distribution level has a significant cost. In the absence of any standardisation, the price of flat wiper blades thus remains much too high.

A connection base and appropriate adapters for various types of actuation arms intended to attach a flat wiping blade are known from document WO2006/069648.

In this document, the connection blade includes on the one hand a stop for receiving the end of an adaptor and on the other hand a resilient locking arm of the other end of the adapter.

The present invention aims at providing an alternative solution to this type of connection base.

For this purpose, the object of the invention is a connection base intended to carry a wiping blade and intended to be attached to an adapter able to be connected to an actuation arm to form with this adapter a mechanical connector for a wiper blade for an automobile, the adaptor having an elongated shape with a first and a second end, characterised in that it includes a retaining linear guiding of the first end of the adapter and removable attachment complementary means of the second end supported on the one hand by the adapter and on the other hand by said base.

Another object of the invention is also an adapter able to be connected on the one hand to a wiping actuation arm, and on the other hand to a connection base carrying a wiping blade to form with such connection base a mechanical connector for a wiper blade for an automobile, the adapter having an elongated shape with a first and a second end, characterised in that the first end has axes intended to cooperate with a retaining linear guide of the connection base and removable attachment complementary means on the second end supported on the one hand by the adapter and on the other hand by said base.

Besides another object of the invention is a mechanical connector for a wiper blade for an automobile, characterised in that it includes on the one hand a connection base such as defined hereabove and on the other hand an adapter such as defined hereabove.

Then, the object of the invention is a flat wiper blade, characterised in that it includes a wiping blade supported by a connection base such as defined hereabove.

Finally, the object of the invention is a wiping device characterised in that it includes a wiper blade such as defined hereabove and an adapter such as defined hereabove connected to an arm actuating a wiping motorized mechanism.

Figure 2:
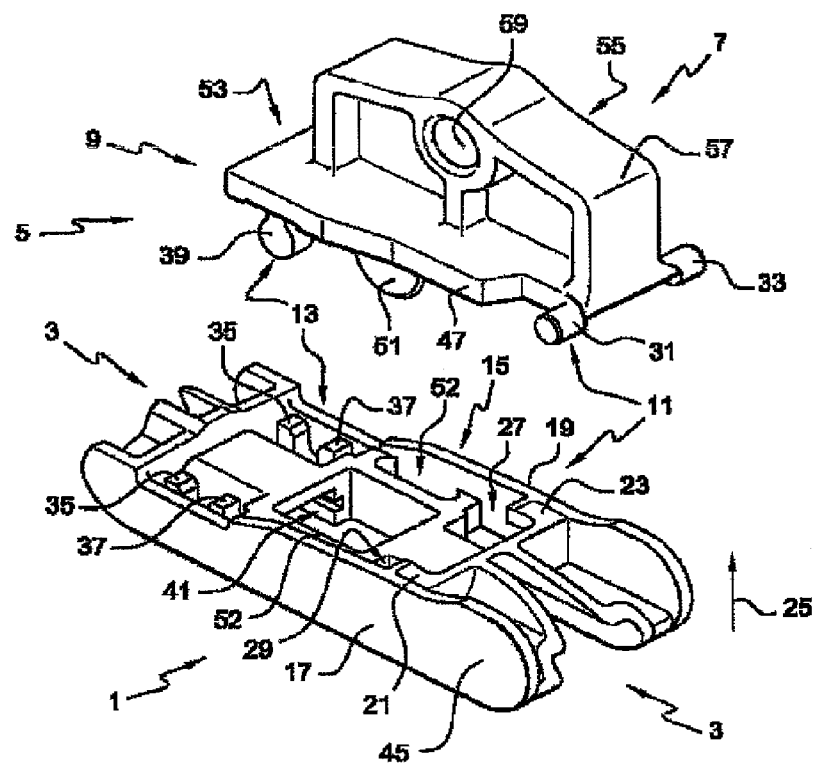
Figure 3:
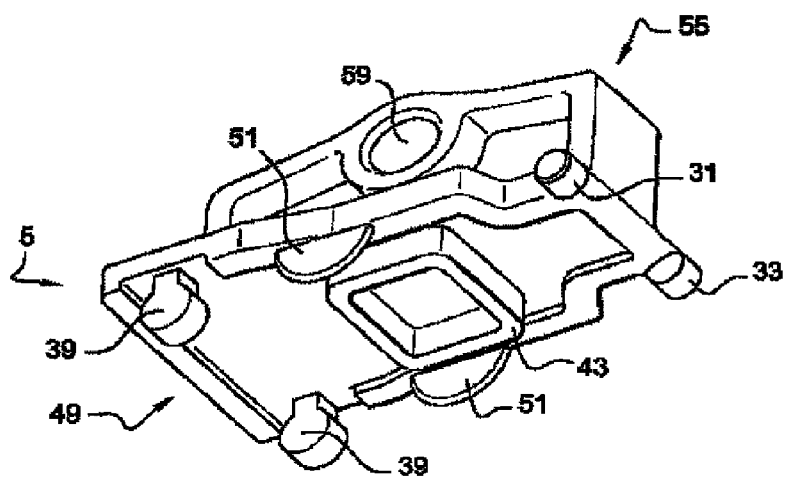
Figure 4:
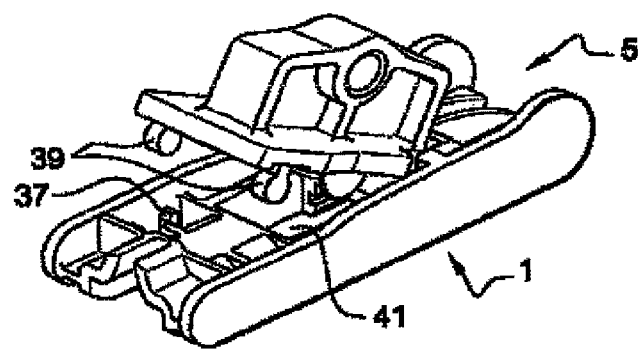
Figure 6:
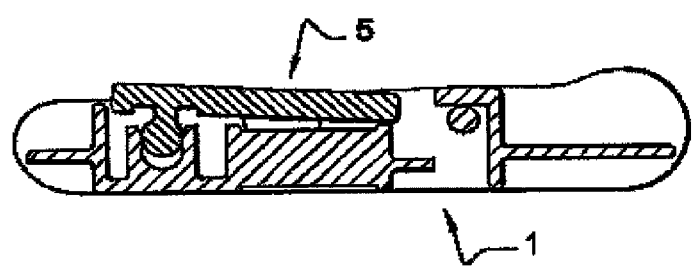
Figure 7:
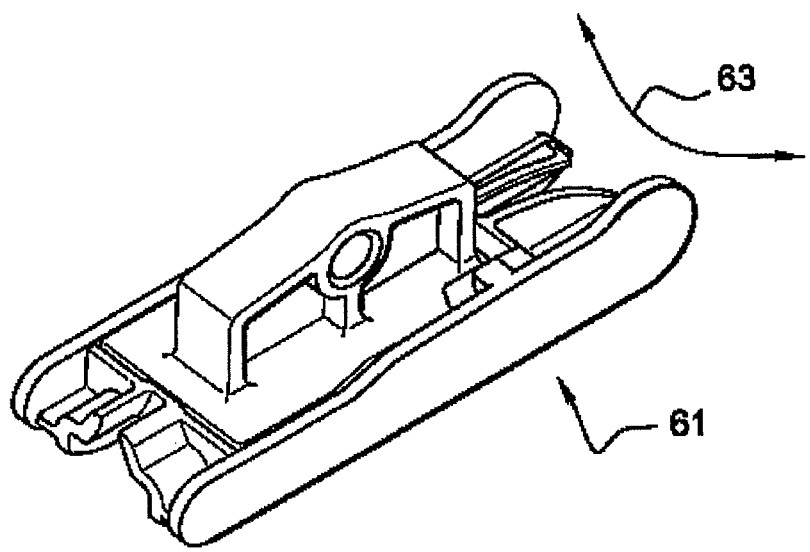
Figure 8:
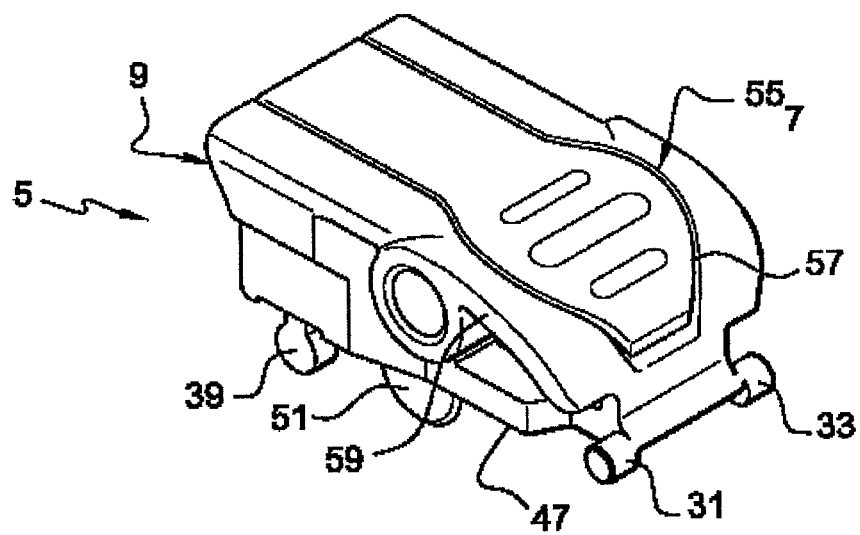
Figure 9:
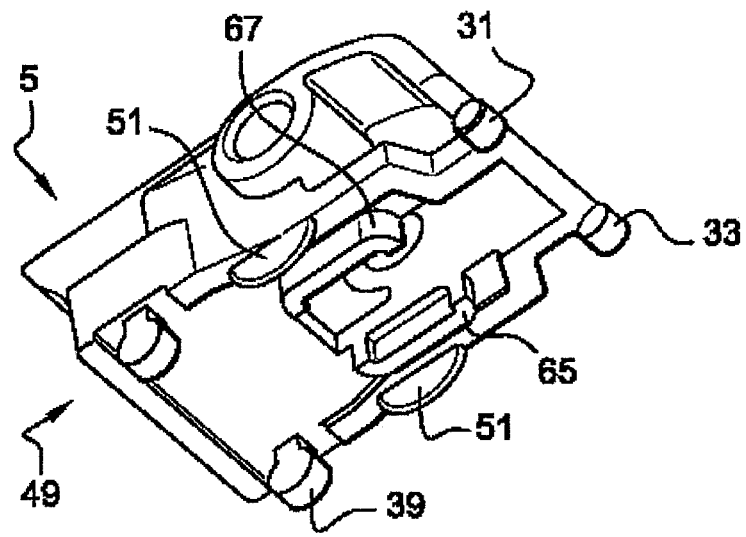
Figure 10:
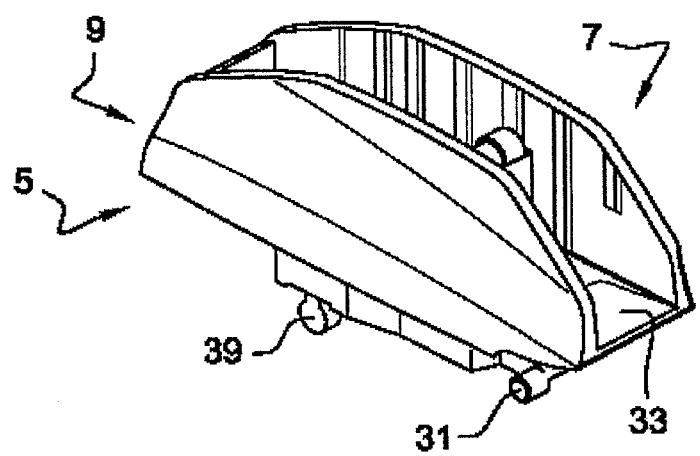
Figure 11:
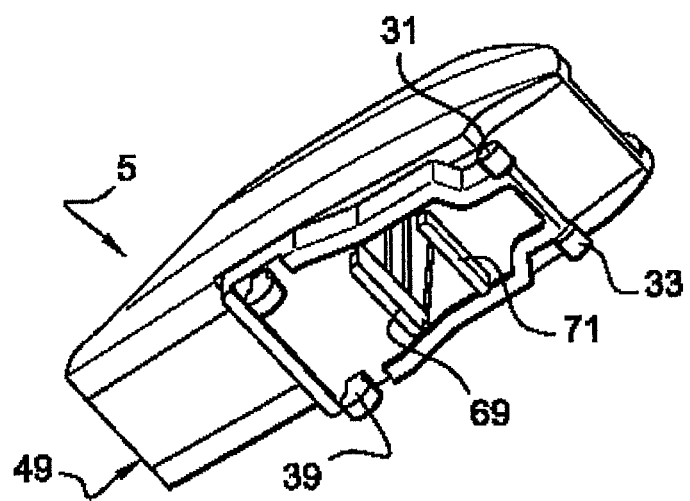
Figure 12:
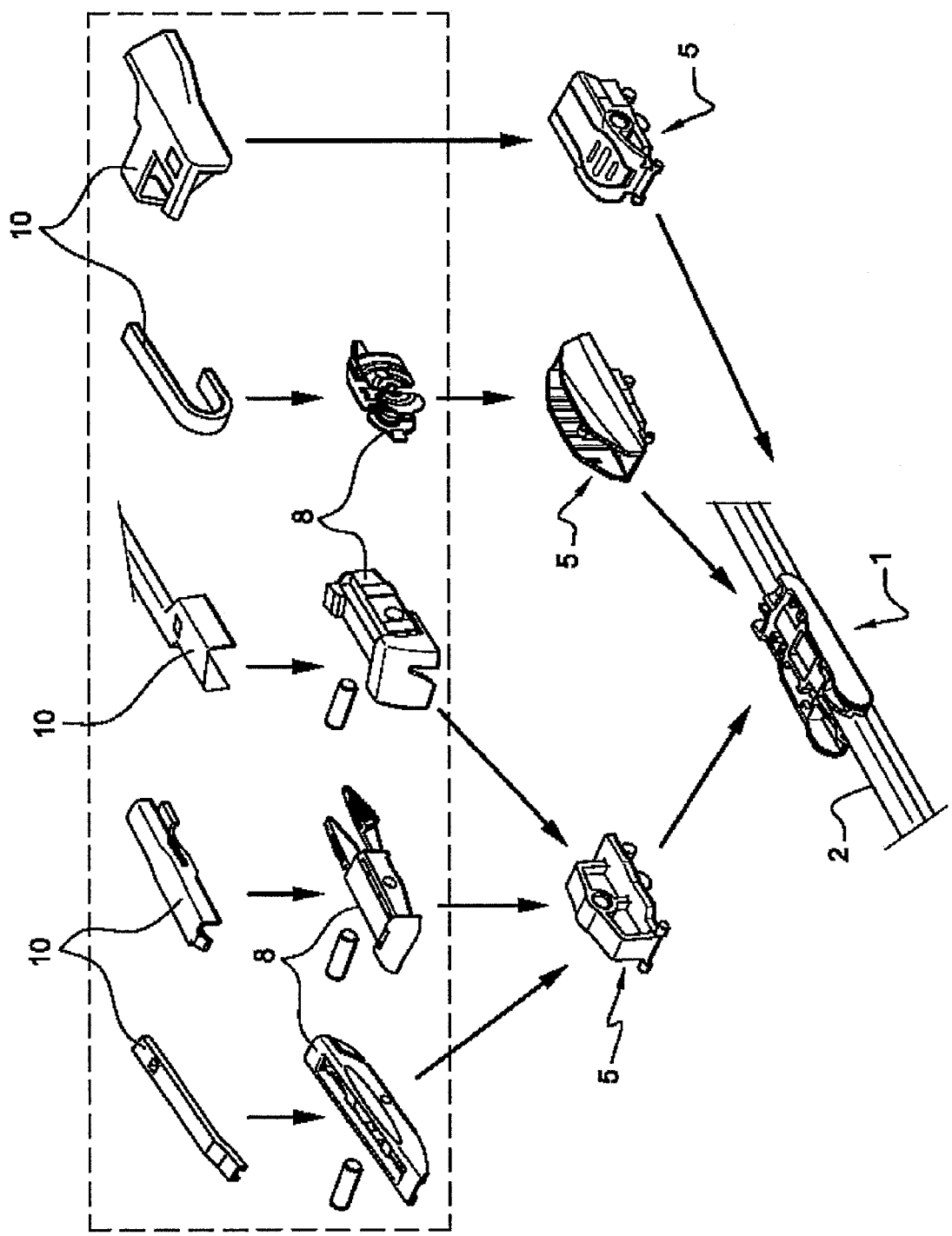

Other advantages and characteristics will appear upon reading the description of the invention and referring to the appended drawings wherein:

FIG. 1 shows a perspective view of an actuation arm as well as a connection base carrying a wiping blade and an adapter according to the invention, FIG. 2 shows a detailed perspective view of a connection base and an adapter according to the invention as per FIG. 1, FIG. 3 shows a perspective view of the adapter of FIG. 2, FIGS. 4, 5, 6 and 7 show perspective and lateral views of a connection base with a conform adapter for explaining the assembling of the adapter with the connection base, FIGS. 8 and 9 show respectively top and bottom perspective views of a conform adapter according to a second embodiment, FIGS. 10 and 11 show respectively top and bottom perspective views of an adapter according to a third embodiment, and FIG. 12 shows a diagram with various associated actuation arms and adapters which can be connected to the same connection base according to the invention.

On all the Figures, identical elements have the same reference numbers.

In FIG. 1 are shown on the one hand a connection base 1 having an elongated shape and intended to support a wiping blade 2 in a retaining channel 3 longitudinally crossing the base 1. This base is more particularly adapted to a flat wiper blade as the one known from document WO2006/069648.

The base 1 is intended to be attached to an adapter 5 also having an elongated shape with a first 7 and a second 9 end and able to be connected directly or through an additional part 8 to an actuation arm 10 to form with this adapter a mechanical connector for a wiper blade for an automobile.

As will be explained subsequently, for each type of attachment of an actuation arm, such as for example hook arms, side pivoting axis arms, longitudinally clamping/snapping arms, etc., a specific adapter 5 will be provided but each of these adapters 5 is adapted to the same connection base 1 through a standard interface. In the present example, the adapter is made to be connected to a longitudinally snapping actuation arm.

When assembled, the wiping blade, the connection base 1, the adapter 5 and the arm actuating the wiping motorised mechanism belong to a device for wiping the windows (for example the windscreen or back window) of an automobile.

As can be seen in FIG. 2, the adapter 5 is fixed on the face of the base opposite that having the wiping blade retaining channel 3.

To attach the adapter 5 on the base 1, first attachment means 11 are provided for retaining the first end 7 of the adapter 5 and second attachment means 13 are provided for retaining the second end 9 of the adapter 5.

The first attachment means 11 include, in the base 1, a linear guide 15 for retaining the first end 7 of the adapter 5.

More particularly, the retaining linear guide 15 is provided on the one hand by portions of the side skirts 17 and 19 of the base 1 which will provide a side guiding of said first end 7 and on the other hand by portions 21 and 13 of the wall perpendicular to the skirts 17 and 19 and preventing the movement of said first end 7 according to a direction perpendicular to the general plane defined by said base 1 as shown by the arrow 25.

Then, the walls of the base 17, 19, 21, 23 are so arranged as to form two insertion channels 27 and 29 able to receive associated side parts 31 and 33 of the first end 7 of the adapter 5. Such side parts 31 and 33 are produced as cylindrical axes.

The second attachment means 13 are manufactured as removable attachment complementary means of the second end supported on the one hand by the adapter 5 and on the other hand by said base 1.

More particularly, the removable attachment complementary means are formed by snapping means including for example two resilient arms 35, 37 having the shape of a fork capable of receiving an associated pin 39 integral with the adapter 5.

Although an embodiment with only one snapping link can be considered, the preferred embodiment provides, as shown in FIG. 2, two arm 35, 37-pin 39 pairs. As a matter of fact, even though one of the snapping links fails, the other can provide a sufficient hold between the adapter 5 and the base 1.

In addition, as the arms 35 and 37 are provided inside the base 1, i.e. between the lateral skirts 17 and 19, the overall dimensions of the base are reduced and these arms 35 and 37 are better protected, for example against breaking.

Advantageously, the base 1 further includes a centring shape 41 able to cooperate with an adapter matching shape 43 (refer for example to FIG. 2).

In the present exemplary embodiment, this centring shape 41 is provided as a square opening in which a matching square shape protrusion 43 supported by the adapter 5 can be inserted.

On the side skirt 17, a place or recess is provided for carrying for example a patch controlling the wearing of the wiping blade.

Advantageously, the base 1 is made in one piece made of plastic material, preferably by injection.

The adapter 5 thus includes a plate 47 supporting, on the lower face thereof 49 (refer to FIG. 3) the pins 39 of the snapping means 13, the axes 31 and 33 of the first end 7 cooperating with the insertion channels 27 and 29, as well as the centring square shape 43. Besides, at least one and preferably two protrusions 51 having the shape of half-discs are advantageously provided on this internal face 49. Such half-discs 51 are positioned on either side of the centring square 43 and able to be accommodated in slots 53 of the base 1 positioned between a wall forming the centring opening 41 and the side skirts 17 and 19. Thus, if the adapter is not aligned opposite the base 1, these half-discs 51 prevent the assembling of the adapter 5 with the connection base 1, thus preventing any deterioration.

On the lower face 53 thereof, the adapter 5 is provided with a link 55 for a longitudinally snapping actuation arm. For this purpose, the fastening 55 includes a structure 57 having a through hole 59 for receiving a pivoting axis.

In FIGS. 5 to 8 are illustrated steps for connecting an adapter 5 to the connection base 1.

Figure 5:
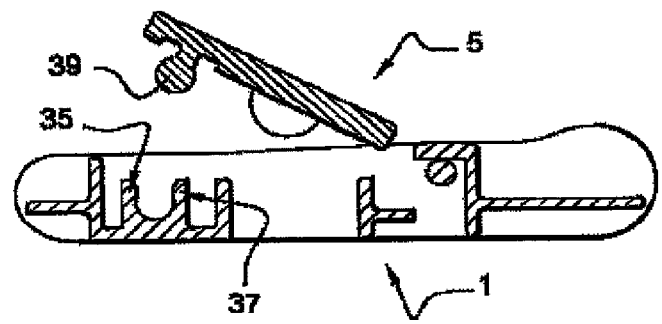

As can be seen in FIG. 5, the first end 7 with the axes 31 and 33 is introduced into the insertion channels 27 and 29. Thus, the axes 31 and 33 go under the walls 21 and 23 and are laterally guided by the skirts 17 and 19 of the connection base 1. To make the insertion easier, the adapter 5 is obliquely introduced so that it makes an angle with the connection base 1.

FIG. 6 is a longitudinal cross-sectional view of the base 1 and the adapter 5 in the same position as the one shown in perspective in FIG. 5.

As can be seen, the insertion channels 27 and 29 form a retaining linear guide of the first end 7 of the adapter, i.e. during the insertion, the end 7 is guided in translation on a small travel and thanks to the walls 21 and 23, it is retained by the walls 19 and 21 which prevent it to move according to the direction perpendicular to the general plane defined by the base 1.

Then, upon completion of the insertion, a pivoting movement is started (FIG. 6) to bring the clamping means 13 opposite each other and for clamping the same hereinafter, as shown in FIG. 6 showing a mechanical connector 61 assembled according to the invention.

In FIG. 7, the arrow 63 shows the wiping movement of the wiper blade which is transversal with respect to the connector 61. It can advantageously be seen that the side skirts 17 and 19 are in contact with the edges of the plate 47 to take up the transversal forces during the wiping.

Thanks to the linear guiding, the holding of the adapter 5 is improved. In addition as the end 7 is linearly guided, the connection between the adapter and the base is always optimum since the guiding can remedy tolerances resulting for example from manufacturing or the weather conditions.

Perspective views of an adapter for a lateral pivoting arm are shown in FIGS. 8 and 9. This adapter is more particularly distinguished by the structure of the fastener 55 adapted for cooperating with this type of actuation arm.

In addition, FIG. 9 shows that the matching shape 43 for the centring of the adapter 5 on the base 1 is not formed by a complete outline of a square but only by two portions 65 and 67 of a square which are parallel to the longitudinal range of the adapter.

FIGS. 10 and 11 show perspective views of an adapter for a hook actuation arm.

FIG. 11 shows that the matching shape 43 for the centring of the adapter 5 on the base 1 is not formed by a complete parameter of a square but only by two portions 69 and 71 of a square which are transversal to the longitudinal range of the adapter 5.

It should be understood that the connection base according to the invention has a reliable connection interface with adapters enabling an improved taking up of the force during the wiping.

FIG. 12 shows a connection base 1 carrying a flat wiping blade 2 such as for example the one described in WO2006/069648. Are also shown three types of adapters 5 of the preceding Figures which are adapted directly or through parts having a shape 8, to the various types of actuation arms 10 shown on a line at the top of the Figure, i.e. from left to right: three various clamping/longitudinally snapping arms, a hook arm and a lateral pivoting axis arm.

Thus, the wiping blades with the connection base 1 can be manufactured as the standardised parts to be used with all the types of actuation arms.

The invention claimed is:

1. A connection base configured to support a wiping blade and to be attached to an adapter, the connection base comprising:
   a first and a second longitudinal end, wherein the connection base has an elongated longitudinal shape in the same direction as the wiper blade, wherein the first longitudinal end comprises a retaining linear guide for a first end of the adapter, the retaining linear guide dimensioned for sliding engagement with the adapter and disposed inside the connection base, wherein the retaining linear guide is provided by base walls arranged to form two insertion channels being spaced apart and each insertion channel having a laterally inward-facing side and walls extending laterally inward past the base wall, configured to receive associated side parts of the first end of the adapter, wherein the second longitudinal end comprises removable attachment complementary means for a second end of the adapter, distinct from the retaining linear guide, said removable attachment complementary means formed by snapping means, wherein the connection base houses the removable attachment complementary means, and wherein the snapping means include two resilient arms comprising a shape of a fork and configured to receive an associated pin of the second end of the adapter.

2. A connection base according to claim 1, wherein each channel is formed by a portion of a side skirt of the base providing a side guiding of said first longitudinal end, and by a portion of a wall perpendicular to the side skirt, wherein the portion of the wall prevents movement of said first longitudinal end according to a direction perpendicular to a general plane defined by said connection base.

3. A connection base according to claim 1, wherein the snapping means include two arm-pin pairs.

4. A connection base according to claim 1, further comprising a centering form configured to cooperate with a matching form of the adapter.

5. The connection base according to claim 4, wherein the centering form is a square opening in a planar surface of the connection base, facing the adapter.

6. A connection base according to claim 1, further comprising a wiping blade retaining channel.

7. A connection base according to claim 1, wherein one of the base walls includes a recess for a patch for controlling the wearing of the wiping blade.

8. A connection base according to claim 1, wherein the connection base is made in one piece using a plastic material.

9. A connection base according to claim 1, wherein the connection base includes first and second lateral skirts, and wherein the resilient arms are disposed within the connection base between the lateral skirts.

10. An adapter configured to be connected to a wiping actuation arm and to a connection base carrying a wiping blade, the adapter comprising:
 a first and a second longitudinal end, wherein the adapter has an elongated longitudinal shape in the same direction as the wiper blade,
 wherein the first longitudinal end comprises side parts in a shape of cylindrical axes configured to cooperate with a retaining linear guide of the connection base, the adapter dimensioned for sliding engagement of the adapter with the retaining linear guide,
 wherein the second longitudinal end comprises removable attachment complementary means configured to cooperate with the connection base,
 wherein said removable attachment complementary means are formed with snapping means, and wherein the snapping means include at least one pin, the at least one pin having a semi-circular shape and protruding downwardly from a planar surface and being positioned laterally inward from laterally outer edges of the planar surface, and wherein the at least one pin is able to cooperate with two resilient arms comprising a shape of a fork, and
 wherein the removable complementary means of the second longitudinal end of the adapter has a different shape from the first longitudinal end.

11. An adapter according to claim 10, wherein the snapping means include two arm-pin pairs.

12. An adapter according to claim 10, further comprising at least one protrusion preventing the assembling of the adapter with said connection base when the removable attachment complementary means are incorrectly aligned.

13. The adapter according to claim 12, wherein the at least one protrusion is a half-disk with a semi-circular shape, extending downward from a bottom of the adapter.

14. The adapter according to claim 10, further comprising a set of walls forming a square, protruding downwardly from the planar surface, configured to cooperate with a matching form of the connection base.

15. A mechanical connector for a wiper blade for an automobile, comprising:
 a connection base according to claim 1; and
 an adapter comprising:
  a first and a second longitudinal end, wherein the adapter has an elongated longitudinal shape in the same direction as the wiper blade,
  wherein the first longitudinal end comprises side parts in the shape of cylindrical axes configured to cooperate with a retaining linear guide of the connection base, the adapter dimensioned for sliding engagement of the adapter with the retaining linear guide,
  wherein the second longitudinal end comprises removable attachment complementary means, distinct from the retaining linear guide, configured to cooperate with the connection base,
  wherein said removable attachment complementary means of the adapter are formed with snapping means, and wherein the snapping means include at least one pin able to cooperate with two resilient arms comprising a shape of a fork,
  wherein the removable complementary means of the second longitudinal end of the adapter has a different shape from the first longitudinal end of the adapter.

16. A flat wiper blade, comprising a wiping blade supported by a connection base according to claim 1.

17. A wiping device, comprising a flat wiper blade according to claim 16 and an adapter connected to an actuation arm of a wiping motorized mechanism, the adapter comprising:
 a first and a second longitudinal end, wherein the adapter has an elongated longitudinal shape in the same direction as the wiper blade,
 wherein the first longitudinal end comprises side parts in the shape of cylindrical axes configured to cooperate with a retaining linear guide of the connection base, the adapter dimensioned for sliding engagement of the adapter with the retaining linear guide,
 wherein the second longitudinal end comprises removable attachment complementary means, distinct from the retaining linear guide, configured to cooperate with the connection base,
 wherein said removable attachment complementary means of the adapter are formed with snapping means, and wherein the snapping means include at least one pin able to cooperate with two resilient arms comprising a shape of a fork, and wherein the removable complementary means of the second longitudinal end of the adapter has a different shape from the first longitudinal end of the adapter.

\* \* \* \* \*